United States Patent
Sachs et al.

(10) Patent No.: US 11,069,237 B2
(45) Date of Patent: Jul. 20, 2021

(54) METHODS IDENTIFYING VEHICLES AND RELATED SYSTEMS, CONTROLLERS, AND VEHICLES

(71) Applicant: Telefonaktiebolaget LM Ericsson (publ), Stockholm (SE)

(72) Inventors: Joachim Sachs, Sollentuna (SE); Mikael Fallgreen, Kista (SE); Nicolas Schrammar, Solna (SE); Johan Torsner, Kyrkslätt (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 34 days.

(21) Appl. No.: 16/311,763

(22) PCT Filed: Oct. 12, 2016

(86) PCT No.: PCT/SE2016/050981
§ 371 (c)(1),
(2) Date: Dec. 20, 2018

(87) PCT Pub. No.: WO2017/222437
PCT Pub. Date: Dec. 28, 2017

(65) Prior Publication Data
US 2019/0213882 A1 Jul. 11, 2019

Related U.S. Application Data

(60) Provisional application No. 62/353,831, filed on Jun. 23, 2016.

(51) Int. Cl.
*G08G 1/0967* (2006.01)
*G08G 1/16* (2006.01)
*H04W 4/40* (2018.01)

(52) U.S. Cl.
CPC . *G08G 1/096791* (2013.01); *G08G 1/096716* (2013.01); *G08G 1/096725* (2013.01);
(Continued)

(58) Field of Classification Search
CPC ...... G08G 1/00; G08G 1/0112; G08G 1/0116; G08G 1/0129; G08G 1/0133;
(Continued)

(56) References Cited

U.S. PATENT DOCUMENTS 9,646,496 B1 * 5/2017 Miller ............... G08G 1/07
2008/0095134 A1 4/2008 Chen et al.
(Continued)

FOREIGN PATENT DOCUMENTS

CN 101573994 A 11/2009
CN 201749568 U 2/2011
(Continued)

OTHER PUBLICATIONS

International Search Report and Written Opinion of the International Searching Authority, PCT/SE2016/050981, dated Mar. 21, 2017, 12 pages.
(Continued)

*Primary Examiner* — Christopher Biagini
(74) *Attorney, Agent, or Firm* — Sage Patent Group

(57) ABSTRACT

According to a first embodiment of inventive concepts, method of operating an intelligent transportation system may include obtaining first traffic information from a first source, with the first traffic information including position information for a first vehicle, and with the first traffic information being generated independently of the first vehicle. Second traffic information may be obtained from a second source, with the second traffic information omitting position information for the first vehicle. Responsive to comparing the first traffic information and the second traffic (Continued)

information, the first vehicle may be identified as being non-collaborative with respect to the intelligent transportation system. Traffic coordination may be provided based on a position of the first vehicle and based on identifying the first vehicle as being non-collaborative with respect to the intelligent transportation system. Further embodiments may include methods of operating a first vehicle, transport system controllers, terminal devices, and computer program products.

14 Claims, 7 Drawing Sheets

(52) U.S. Cl.
CPC . *G08G 1/096741* (2013.01); *G08G 1/096783* (2013.01); *G08G 1/162* (2013.01); *G08G 1/163* (2013.01); *G08G 1/166* (2013.01); *G08G 1/167* (2013.01); *H04W 4/40* (2018.02)

(58) Field of Classification Search
CPC ...... G08G 1/0141; G08G 1/0145; G08G 1/07; G08G 1/096716; G08G 1/096725; G08G 1/096741; G08G 1/096775; G08G 1/096783; G08G 1/096791; G08G 1/096844; G08G 1/161; G08G 1/162; G08G 1/163; G08G 1/164; G08G 1/166; G08G 1/167; G08G 1/22; H04W 4/40
See application file for complete search history.

(56) References Cited

U.S. PATENT DOCUMENTS

| | | |
|---|---|---|
| 2009/0248284 A1 | 10/2009 | Yoshioka |
| 2009/0285197 A1 | 11/2009 | Chen et al. |
| 2010/0188265 A1 | 7/2010 | Hill et al. |
| 2010/0198513 A1 | 8/2010 | Zeng et al. |
| 2012/0010762 A1 | 1/2012 | Asano |
| 2012/0105625 A1* | 5/2012 | Richardson ............ G08G 1/164 348/135 |
| 2013/0276111 A1* | 10/2013 | Taha ...................... G06F 21/56 726/23 |
| 2013/0279393 A1 | 10/2013 | Rubin et al. |
| 2013/0294230 A1* | 11/2013 | Popa ...................... H04L 47/743 370/230 |
| 2014/0302774 A1* | 10/2014 | Burke ..................... H04W 4/08 455/3.05 |
| 2015/0054659 A1 | 2/2015 | Chen |
| 2018/0184270 A1* | 6/2018 | Chun .................... H04W 76/14 |
| 2018/0211529 A1* | 7/2018 | Kaur .................... G08G 1/0112 |

FOREIGN PATENT DOCUMENTS

| | | |
|---|---|---|
| CN | 104298195 A | 1/2015 |
| CN | 104424798 A | 3/2015 |
| CN | 105321340 A | 2/2016 |
| CN | 105427669 A | 3/2016 |
| JP | 2969176 B1 | 11/1999 |
| JP | 2015/102893 A | 6/2015 |
| KR | 20110065262 A | 6/2011 |
| WO | WO 2008/053912 A1 | 5/2008 |
| WO | WO 2012/014033 A1 | 2/2012 |

OTHER PUBLICATIONS

5G PPP, 5G Automotive Vision, Oct. 20, 2015, 67 pages.
Office Action for Chinese Patent Application No. 201680087000.7 dated Feb. 1, 2021.
Japanese Office Action for Japanese Patent Application No. 2018-564933 dated Nov. 27, 2020, 5 pages.
English Summary of Japanese Office Action for Japanese Patent Application No. 2018-564933 dated Nov. 27, 2020, 4 pages.

* cited by examiner

METHODS IDENTIFYING VEHICLES AND RELATED SYSTEMS, CONTROLLERS, AND VEHICLES

CROSS REFERENCE TO RELATED APPLICATIONS

This application is a 35 U.S.C. § 371 national stage application of PCT International Application No. PCT/SE2016/050981 filed on Oct. 12, 2016, which in turns claims domestic priority to U.S. Provisional Patent Application No. 62/353,831, filed on Jun. 23, 2016, the disclosures and content of which are incorporated by reference herein in their entirety.

TECHNICAL FIELD

The present disclosure relates to intelligent transportation systems and related methods, controllers, and vehicles.

BACKGROUND

Intelligent transport systems and vehicular services based on vehicle-to-anything (V2X) communications are being introduced and prepared. The communication modes for these use cases are typically referred to V2X where V stands for vehicle, and where X could be P for pedestrian, V for Vehicle, I for infrastructure, N for Network, etc. V2X communication can, for example, occur based on V2X communication standards such as 802.11p, ETSI ITS-G5, DSRC, LTE-V2X, 5G-V2X. FIG. 1 illustrates different V2X scenarios where P means pedestrian, I means Infrastructure, N means network, and V means vehicle.

V2X based services may include road hazard warnings, advanced driver assistance services, (cooperative) collision avoidance services, increased situational awareness, cooperative sensing, intelligent traffic management (e.g., via traffic signal timing and priority, optimal speed advice, and/or real-time traffic routing), emergency vehicle alerts, see-through video transfer from vehicles blocking sight, cooperative adaptive cruise control, high density platooning, cooperative lane merge and lane change, and/or automated overtaking. Advanced V2X functionality may support semi-autonomous/autonomous driving where cars either collaboratively determine their driving maneuvers (e.g., by exchanging intended trajectories), or where human drivers are assisted with enhanced situation awareness from information shared among vehicles, road users and/or transport infrastructure.

Evolution of V2X-based services according to the Car-2-Car (Car2Car) Communication Consortium is illustrated in FIG. 2, including GLOSA (Green Light Optimized Speed Advisory), ACC (Adaptive Cruise Control), and/or VRU (Vulnerable Road User). In a first phase, warning messages are distributed to vehicles. In a second phase, sensor information is shared among vehicles and with the infrastructure. In a 3rd phase, driving maneuvers are shared among vehicles and aligned with a transport infrastructure. In a 4th phase, driving maneuvers are coordinated among vehicles and aligned with the transport infrastructure. In a 5th phase, driving maneuvers are fully coordinated and aligned for self-driving vehicles without a need of human intervention. Within these use cases, a collective perception of the environment may be increasingly enabled. Examples of the evolution of automotive services are provided, for example, in 5G-Infrastructure-Association, "5G Automotive Vision," Oct. 20, 2015 (https://5g-ppp.eu/white-papers/).

The continued presence of legacy vehicles (also referred to as non-collaborative vehicles, old-timer vehicles, etc.) that do not support V2X communication capability, however, may limit evolution of V2X-based services.

The approaches described above could be pursued, but are not necessarily approaches that have been previously conceived or pursued. Therefore, unless otherwise indicated herein, the approaches described above are not prior art to embodiments in this application and are not admitted to be prior art by inclusion above.

SUMMARY

According to some embodiments of inventive concepts, a method may be provided to operate an intelligent transportation system. The method may include obtaining first traffic information from a first source, wherein the first traffic information includes position information for a first vehicle, and wherein the first traffic information is generated independently of the first vehicle. Second traffic information may be obtained from a second source, wherein the second traffic information omits position information for the first vehicle. Responsive to comparing the first traffic information and the second traffic information, the first vehicle may be identified as being non-collaborative with respect to the intelligent transportation system, and traffic coordination may be provided based on a position of the first vehicle and based on identifying the first vehicle as being non-collaborative with respect to the intelligent transportation system.

The first traffic information may include first position information for a second vehicle, and the second traffic information may include second position information for the second vehicle. The second source may include the second vehicle so that the second position information for the second vehicle is based on a communication transmitted from the second vehicle. Moreover, providing traffic coordination may be based on positions of the first and second vehicles.

Identifying the first vehicle as being non-collaborative with respect to the intelligent transportation system may include identifying the first vehicle as being non-collaborative based on inclusion of the position information for the first vehicle in the first traffic information and omission of position information for the first vehicle from the second traffic information.

The second traffic information may include position information for a plurality of vehicles based on respective communications transmitted from the plurality of vehicles without including position information for the first vehicle.

The communication transmitted from the second vehicle may be a V2X communication transmitted from the second vehicle over a wireless interface. Obtaining the second traffic information may include receiving the communication from the second vehicle at a processor of the intelligent transportation system through a network interface and a V2X communication sensor, and the network interface may be coupled with the V2X Communication Sensor which is remote from the processor. Obtaining the second traffic information may include receiving the communication transmitted from the second vehicle at a processor of the intelligent transportation system through a V2X wireless interface coupled with the processor.

The first traffic information generated independently of the first vehicle may be based on video information.

The first traffic information generated independently of the first vehicle may include information generated based on a sensor on and/or embedded in a roadway.

The first traffic information generated independently of the first vehicle may include information generated at the second vehicle and/or information generated at a third vehicle. The information generated at the second vehicle and/or the third vehicle may be provided using a V2X communication transmitted from the second vehicle and/or the third vehicle over a wireless interface.

Providing traffic coordination may include transmitting a traffic coordination communication to the second vehicle and/or to another vehicle.

Providing traffic coordination may include at least one of: generating a dynamic map including information identifying positions, speeds, and/or directions of travel of the first vehicle (NCV-1) and the second vehicle (CV-2); determining a number and/or percentage of vehicles that are non-collaborative with respect to the intelligent transportation system; determining a number and/or percentage of vehicles that are non-collaborative with respect to the intelligent transportation system, and generating a warning responsive to the number and/or percentage exceeding a threshold; determining a number and/or percentage of vehicles that are non-collaborative with respect to the intelligent transportation system, generating a warning responsive to the number and/or percentage exceeding a threshold, and transmitting the warning as a warning communication to the second vehicle (CV-2) and/or to a third vehicle (CV-3); and/or determining a number and/or percentage of vehicles that are non-collaborative with respect to the intelligent transportation system, generating a warning responsive to the number and/or percentage exceeding a threshold and controlling a display/signal to provide the warning as a visual warning.

According to some other embodiments of inventive concepts, a method may be provided to operate a first vehicle in an intelligent transportation system. The method may include obtaining first traffic information that includes position information for a second vehicle based on a communication transmitted from the second vehicle. Second traffic information may be obtained that includes position information for the second vehicle and for a third vehicle, wherein the second traffic information is generated independently of the third vehicle. Responsive to comparing the first traffic information and the second traffic information, the third vehicle may be identified as being non-collaborative with respect to the intelligent transportation system. Traffic coordination may be provided based on positions of the first vehicle, the second vehicle, and the third vehicle, and based on identifying the third vehicle as being non-collaborative with respect to the intelligent transportation system.

Obtaining the first traffic information may include receiving the first traffic information via a roadway communication node separate from the second vehicle.

Obtaining the first traffic information may include receiving the communication transmitted from the second vehicle directly from the second vehicle.

Obtaining the second traffic information may include receiving the second traffic information via a roadway communication node separate from the second vehicle, and wherein the second traffic information is based on a sensor separate from the second vehicle.

Obtaining the second traffic information may include generating the second traffic information based on a sensor on the vehicle.

Providing traffic coordination may include at least one of: transmitting information including at least one of position information for the first vehicle, position information for the second vehicle, and/or position information for the third vehicle to at least one of the second vehicle and/or a fourth vehicle; transmitting information including at least one of position information for the first vehicle, position information for the second vehicle, and/or position information for the third vehicle to a communication node of the intelligent transportation system; generating a warning message and/or an automated driving instruction to operate the first vehicle; and/or transmitting at least one of a warning message, an automated driving instruction, and/or intended trajectory information to at least one of the second vehicle and/or a fourth vehicle.

Transmitting may include transmitting at least one of the warning message, the automated driving instruction, and/or the intended trajectory information directly to at least one of the second vehicle and/or a fourth vehicle; and/or transmitting at least one of the warning message, the automated driving instruction, and/or the intended trajectory information to at least one of the second vehicle and/or a fourth vehicle via a communication node of the intelligent transportation system.

According to some other embodiments of inventive concepts, a transportation system controller of an intelligent transportation system may be provided. The transportation system controller may include a network interface configured to communicate with a roadway communication node and a vehicle detection sensor, and a processor coupled to the network interface. The processor may be configured to obtain first traffic information from a first source, wherein the first traffic information includes position information for a first vehicle, and wherein the first traffic information is generated independently of the first vehicle. The processor may be configured to obtain second traffic information from a second source, wherein the second traffic information omits position information for the first vehicle. The processor may be configured to identify the first vehicle as being non-collaborative with respect to the intelligent transportation system, responsive to comparing the first traffic information and the second traffic information. The processor may be configured to provide traffic coordination based on a position of the first vehicle and based on identifying the first vehicle as being non-collaborative with respect to the intelligent transportation system.

According to still other embodiments of inventive concepts, a transportation system controller of an intelligent transportation system may be provided. The transportation system controller may be adapted to obtain first traffic information from a first source, wherein the first traffic information includes position information for a first vehicle, and wherein the first traffic information is generated independently of the first vehicle. The transportation system controller may be adapted to obtain second traffic information from a second source, wherein the second traffic information omits position information for the first vehicle. The transportation system controller may be adapted to identify the first vehicle as being non-collaborative with respect to the intelligent transportation system, responsive to comparing the first traffic information and the second traffic information. The transportation system controller may be adapted to provide traffic coordination based on a position of the first vehicle and based on identifying the first vehicle as being non-collaborative with respect to the intelligent transportation system.

According to yet other embodiments of inventive concepts, a transportation system controller of an intelligent transportation system may be provided. The transportation system controller may include a first obtaining module configured to obtain first traffic information from a first source, wherein the first traffic information includes position information for a first vehicle, and wherein the first traffic information is generated independently of the first vehicle. The transportation system controller may include a second obtaining module configured to obtain second traffic information from a second source, wherein the second traffic information omits position information for the first vehicle. The transportation system controller may include an identifying module configured to identify the first vehicle as being non-collaborative with respect to the intelligent transportation system responsive to comparing the first traffic information and the second traffic information. The transportation system controller may include a providing module configured to provide traffic coordination based on a position of the first vehicle and based on identifying the first vehicle as being non-collaborative with respect to the intelligent transportation system.

According to further embodiments of inventive concepts, a computer program product may include a non-transitory computer readable storage medium storing instructions which when run on a processor causes a transportation system controller including the processor to obtain first traffic information from a first source, wherein the first traffic information includes position information for a first vehicle, and wherein the first traffic information is generated independently of the first vehicle. The instructions which when run on a processor causes a transportation system controller including the processor to obtain second traffic information from a second source, wherein the second traffic information omits position information for the first vehicle. The instructions which when run on a processor causes a transportation system controller including the processor to identify the first vehicle as being non-collaborative with respect to the intelligent transportation system responsive to comparing the first traffic information and the second traffic information. The instructions which when run on a processor causes a transportation system controller including the processor to provide traffic coordination based on a position of the first vehicle and based on identifying the first vehicle as being non-collaborative with respect to the intelligent transportation system.

According to still further embodiments of inventive concepts, a terminal device of a collaborative first vehicle configured to operate in an intelligent transportation system may be provided. The terminal device may include a wireless interface configured to communicate with a roadway communication node, and a processor coupled to the wireless interface. The processor may be configured to obtain first traffic information that includes position information for a second vehicle based on a communication transmitted from the second vehicle. The processor may be configured to obtain second traffic information that includes position information for the second vehicle and for a third vehicle wherein the second traffic information is generated independently of the third vehicle. The processor may be configured to identify the third vehicle as being non-collaborative with respect to the intelligent transportation system, responsive to comparing the first traffic information and the second traffic information. The processor may be configured to provide traffic coordination based on positions of the first vehicle, the second vehicle, and the third vehicle, and based on identifying the third vehicle as being non-collaborative with respect to the intelligent transportation system.

According to yet further embodiments of inventive concepts, a terminal device of a first vehicle configured to operate in an intelligent transportation system may be provided. The terminal device may be adapted to obtain first traffic information that includes position information for a second vehicle based on a communication transmitted from the second vehicle. The terminal device may be adapted to obtain second traffic information that includes position information for the second vehicle and for a third vehicle wherein the second traffic information is generated independently of the third vehicle. The terminal device may be adapted to identify the third vehicle as being non-collaborative with respect to the intelligent transportation system, responsive to comparing the first traffic information and the second traffic information. The terminal device may be adapted to provide traffic coordination based on positions of the first vehicle, the second vehicle, and the third vehicle, and based on identifying the third vehicle as being non-collaborative with respect to the intelligent transportation system.

According to more embodiments of inventive concepts, a terminal device of a collaborative first vehicle configured to operate in an intelligent transportation system may be provided. The terminal device may include a first obtaining module configured to obtain first traffic information that includes position information for a second vehicle based on a communication transmitted from the second vehicle. The terminal device may include a second obtaining module configured to obtain second traffic information that includes position information for the second vehicle and for a third vehicle wherein the second traffic information is generated independently of the third vehicle. The terminal device may include an identifying module configured to identify the third vehicle as being non-collaborative with respect to the intelligent transportation system responsive to comparing the first traffic information and the second traffic information. The terminal device may include a providing module configured to provide traffic coordination based on positions of the first vehicle, the second vehicle, and the third vehicle, and based on identifying the third vehicle as being non-collaborative with respect to the intelligent transportation system.

According to still more embodiments of inventive concepts, a computer program product may include a non-transitory computer readable storage medium storing instructions which when run on a processor causes a terminal device of a first vehicle including the processor to obtain first traffic information that includes position information for a second vehicle based on a communication transmitted from the second vehicle. The instructions may cause the terminal device including the processor to obtain second traffic information that includes position information for the second vehicle and for a third vehicle wherein the second traffic information is generated independently of the third vehicle. The instructions may cause the terminal device including the processor to identify the third vehicle as being non-collaborative with respect to the intelligent transportation system, responsive to comparing the first traffic information and the second traffic information. The instructions may cause the terminal device including the processor to provide traffic coordination based on positions of the first vehicle, the second vehicle, and the third vehicle, and based on identifying the third vehicle as being non-collaborative with respect to the intelligent transportation system.

According to some embodiments, an intelligent transportation system may thus incorporate information from different sources (e.g., a passive source, such as a roadside traffic camera, and an active source based on communications received from vehicles that are collaborative with respect to the intelligent transportation system) to better identify vehicles that are non-collaborative with respect to the intelligent transportation system (also referred to as legacy vehicles, non-collaborative vehicles, etc.) and/or to better coordinate traffic based on knowledge of such non-collaborative vehicles. Accordingly, risk of accidents may be reduced, and/or traffic efficiency may be improved.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
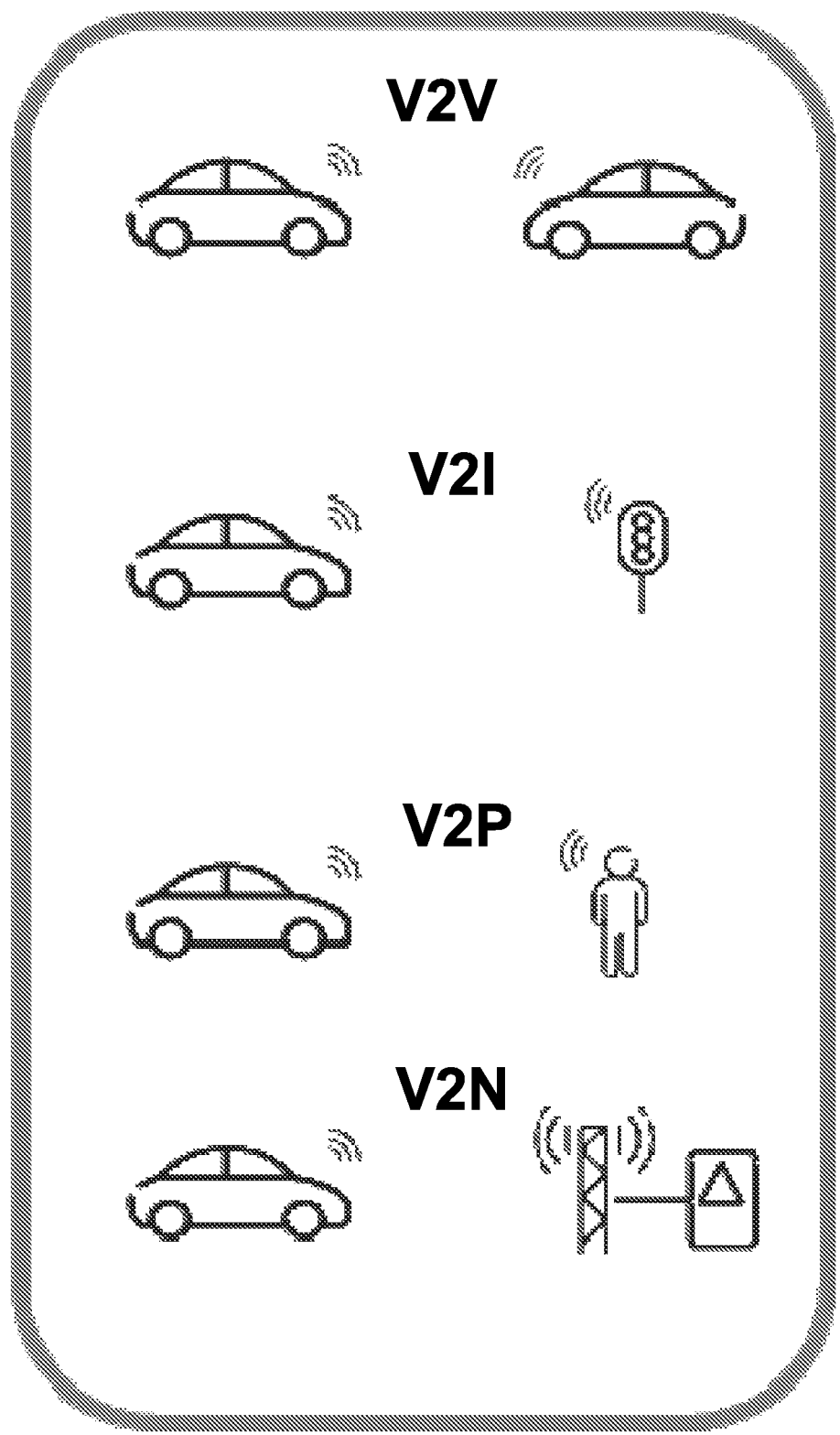
FIG. 1 illustrates different V2X scenarios where P means pedestrian, I means Infrastructure, N means network, and V means vehicle.
Figure 2:
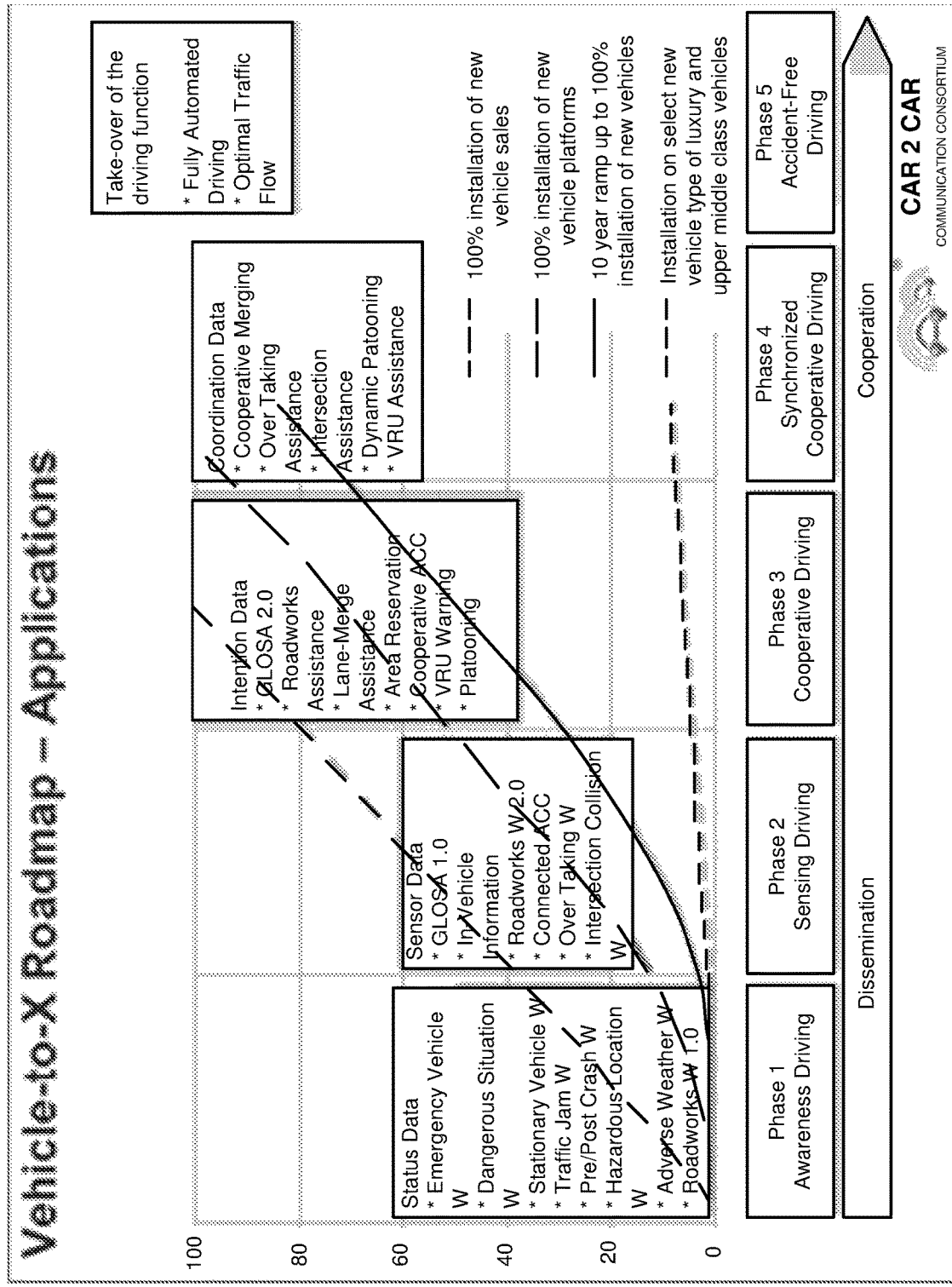
FIG. 2 illustrates a roadmap of V2X communication applications of the Car2Car Communication Consortium including GLOSA (Green Light Optimized Speed Advisory), ACC (Adaptive Cruise Control), and VRU (vulnerable road user)

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Aspects of V2X service functionality may be based on an assumption that many vehicles support collaborative actions via V2X communications. If there are vehicles which do not support the collaborative actions, however, these non-collaborative vehicles may put the success of collaborative maneuvers of other collaborative vehicles at risk. In a lane merge setup, for example, vehicles entering the road may coordinate with cars on the road approaching an entry lane to provide sufficient spaces for the entering vehicles.

However, the collaborative vehicles/infrastructure may only be aware of the vehicles (referred to as collaborative vehicles or CV) that participate in the collaboration using V2X communication. There may be a risk that an entry gap is assumed by other vehicles (i.e, non-collaborative vehicles), which in fact is already occupied by a non-collaborating vehicle (e.g., an old-timer or legacy vehicle). As the entering vehicle is expecting a gap that it wants to drive into, there is an increased risk of accident. Similarly, other types of V2X services may be prohibited if a sufficiently high number of non-collaborative vehicles (e.g., vehicles that do not support V2X communication) exist and are not observed and do not participate in the collaborative V2X service. In general terms, the presence of non-collaborative vehicles within a collaborative V2X service setup may hamper use of advanced automotive services and/or intelligent transport system services (such as collaborative driving functionality), may increase/create risks of accidents, and/or may reduce efficiency.

A collaborative vehicle is a vehicle that participates sufficiently in V2X communication and/or that provides vehicle information to its surrounding transport environment in an appropriate way. According to some embodiments of inventive concepts disclosed herein, two types of vehicle detection mechanisms are provided and combined, with a first type being based on receiving and analyzing V2X communication messages (also referred to as V2X communications) received from collaborative vehicles, and with a second type being based on a passive vehicle detection mechanism/mechanisms (e.g., using feature analysis of a video camera/cameras, using radar measurements, using LIDAR (Light Detection And Ranging) images, etc.). A difference between the two types of vehicle detection mechanisms is that the first type may rely on a vehicular communication capability (e.g., a V2X capability) of a detected collaborative vehicle, while the second type may rely on information provided independently of a non-collaborative vehicle. The results of the two detection mechanisms may be correlated to identify a discrepancy, which indicates the presence of one/some vehicles that do not participated in V2X communication services. This discrepancy can be used, for example, to provide a warning message to other vehicles, to compose a local dynamic map indicating positions of non-collaborative vehicles, and/or to report position and/or direction of non-collaborative vehicles by providing a V2X message on behalf of the non-collaborative vehicle.

The aforementioned V2X use cases may increase traffic efficiency and/or may reduce risk for accidents. Legacy vehicles without V2X functionality, however, may be unable to collaborate in such use cases, and such legacy vehicles may thus reduce benefits of such use cases or even make such use cases infeasible. According to some embodiments of inventive concepts, it may be possible to include information regarding such legacy vehicles in the collaborative V2X system. This may be achieved by detecting legacy vehicles using one or more passive detection mechanisms, as well as reporting positions of such legacy vehicles. In this way, benefits of V2X use cases may be realized, which might otherwise require a large market penetration of V2X technology.

In areas where collaborative V2X services may be used (e.g., in cooperative maneuvers like lane merge, management in high-risk intersections, etc.), the road infrastructure may be equipped with two different vehicle analysis sensor types for a common road section:

1) A V2X communication sensor "A" (shown as SA, and also referred to as a roadway communication node of the intelligent transportation system) that monitors vehicular/V2X communications of the passing collaborative vehicles and that can identify and locate the collaborative vehicles based on the vehicular communications (e.g., V2X communications).
2) A passive vehicle detection sensor "B" (shown as SB) that monitors and extracts information about vehicles (including non-collaborative vehicles) passing at a certain location (or entering the area of collaborative maneuver). A typical sensor could be a video camera with vehicle detection, but other sensors are also possible, e.g., based on radar, lidar, magnetic induction, etc.

The use of both sensor types "A" and "B" may thus enable an identification of collaborative and non-collaborative vehicles. A control entity (e.g., a processor) may compare the vehicles detected by sensor types "A" and "B" and may determine a discrepancy when more vehicles are detected with sensor type "B" than with sensor type "A", meaning that non-collaborative vehicles are present in the area that do not support V2X communication and that may otherwise be "invisible" to the collaborative actions among other vehicles/infrastructure that are based on vehicular/V2X communication.

Once the discrepancy is detected, the discrepancy can be classified according to a severity level (e.g., based on a rate or percentage of non-collaborative vehicles, based on a location of the NCV being considered a high-risk location, and/or based on the total traffic load being beyond a threshold). Based on this severity level, one or more of the following actions may be triggered, including:

Provide a warning in an area around the vehicle detection indicating that that V2X-based collaborative services are at risk due the presence of non-participating vehicles (i.e., non-collaborative vehicles). The warning could provide enhanced information, such as, a number or percentage of non-collaborating vehicles.

Provide some additional information (position, speed, direction, etc.) about non-collaborative (hidden) vehicles via V2X communication so that non-collaborative vehicles can be considered on a dynamic map and factored in the collaborative V2X service.

Modern cars may be equipped with several passive sensors to detect other vehicles (e.g., cameras, radar, lidar, etc.) over short distances. In addition, vehicular/V2X communication may provide additional detection based on communication with/between vehicles and may thus enable vehicle detection over longer distances. Inherently, only V2X equipped vehicles can be detected using V2X communications, while legacy vehicles may be "invisible" using detection based on such V2X communications. According to some embodiments of inventive concepts, legacy vehicles (and positions thereof) may be detected and identified as legacy vehicles to provide improved risk assessment. Detection/identification of legacy vehicles may also allow reporting of legacy vehicles to incorporate consideration of such legacy vehicles in the V2X cooperation.

Figure 3:
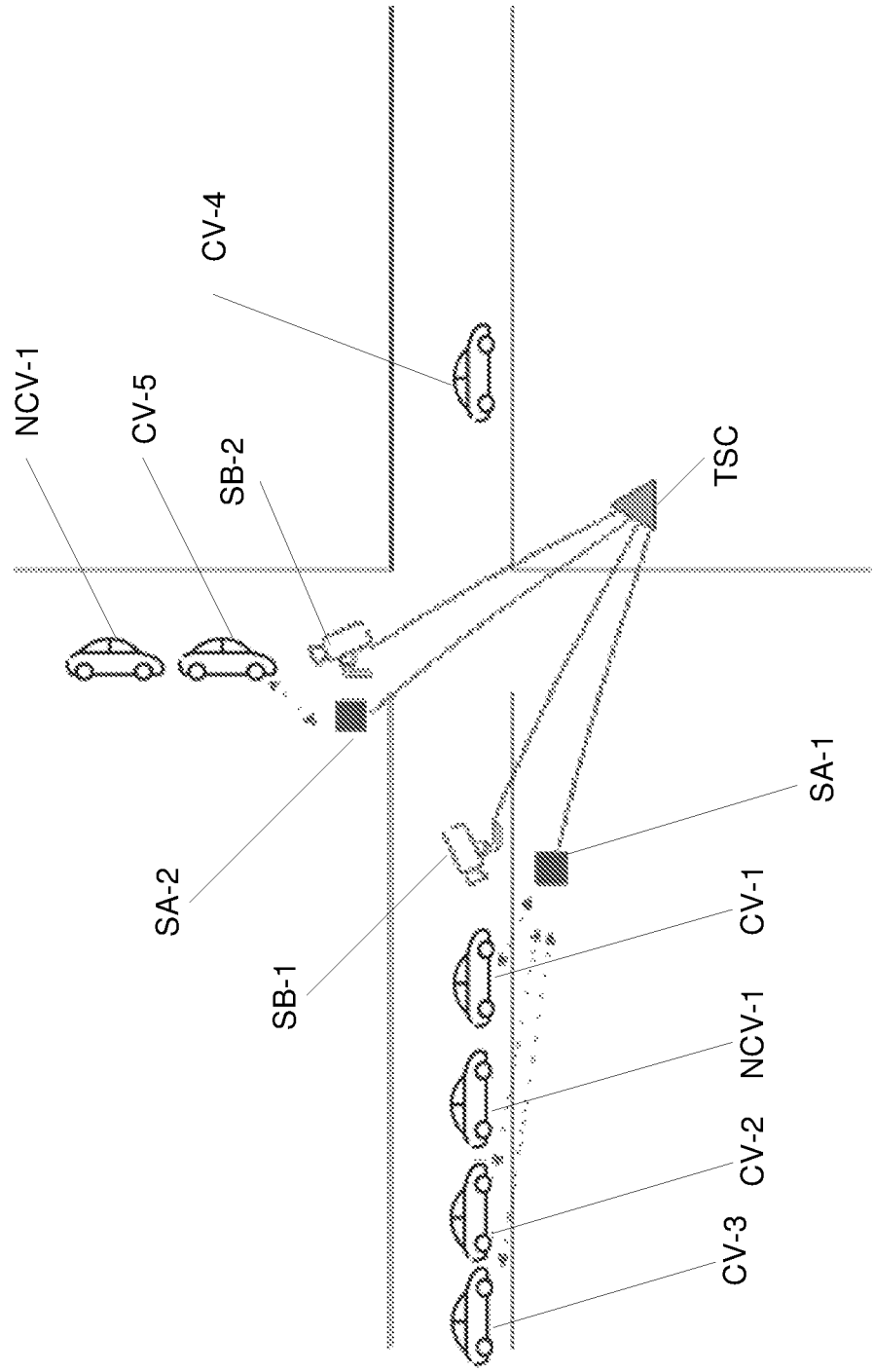
FIG. 3 is a diagram illustrating intersection coordination according to some embodiments of inventive concepts.

According to some embodiments illustrated in FIG. 3, an intelligent transportation system may include a transportation system controller TSC (also referred to as a transportation control apparatus) coupled with V2X communication sensors SA-1 and SA-2 (also referred to as active vehicle detection sensors, roadway communication nodes) and passive vehicle detection sensors (e.g., video traffic cameras) SB-1 and SB-2 at an intersection of two streets. In the example of FIG. 3, collaborative vehicles CV-1, CV-2, and CV-3 may automatically transmit position information to communication sensor SA-1; collaborative vehicle CV-5 may automatically transmit position information to communication sensor SA-2; and non-collaborative vehicles NCV-1 and NCV-2 may be legacy vehicles that do not support communications with communication sensors of the intelligent transportation system.

Controller TSC may receive information (including positional information) from collaborative vehicles CV-1, CV-2, and CV-3 via communication sensor SA-1 allowing controller TSC to determine positions of collaborative vehicles CV-1, CV-2, and CV-3. Controller TSC may also receive information from passive sensor SB-1 allowing controller TSC to separately determine positions of collaborative vehicles CV-1, CV-2, and CV-3 and non-collaborative vehicle NCV-1. Controller TSC may then compare positions determined using information from communication sensor SA-1 and positions determined using information from passive sensor SB-1 to determine that vehicle NCV-1 is non-collaborative with respect to the intelligent transportation system. Stated in other words, the discrepancy between vehicles/positions identified/determined using the two different sources may be used to identify non-collaborative vehicles. Controller TSC may perform similar operations with respect to vehicles CV-5 and NCV-1 using communication sensor SA-2 and passive sensor SB-2.

Figure 4:
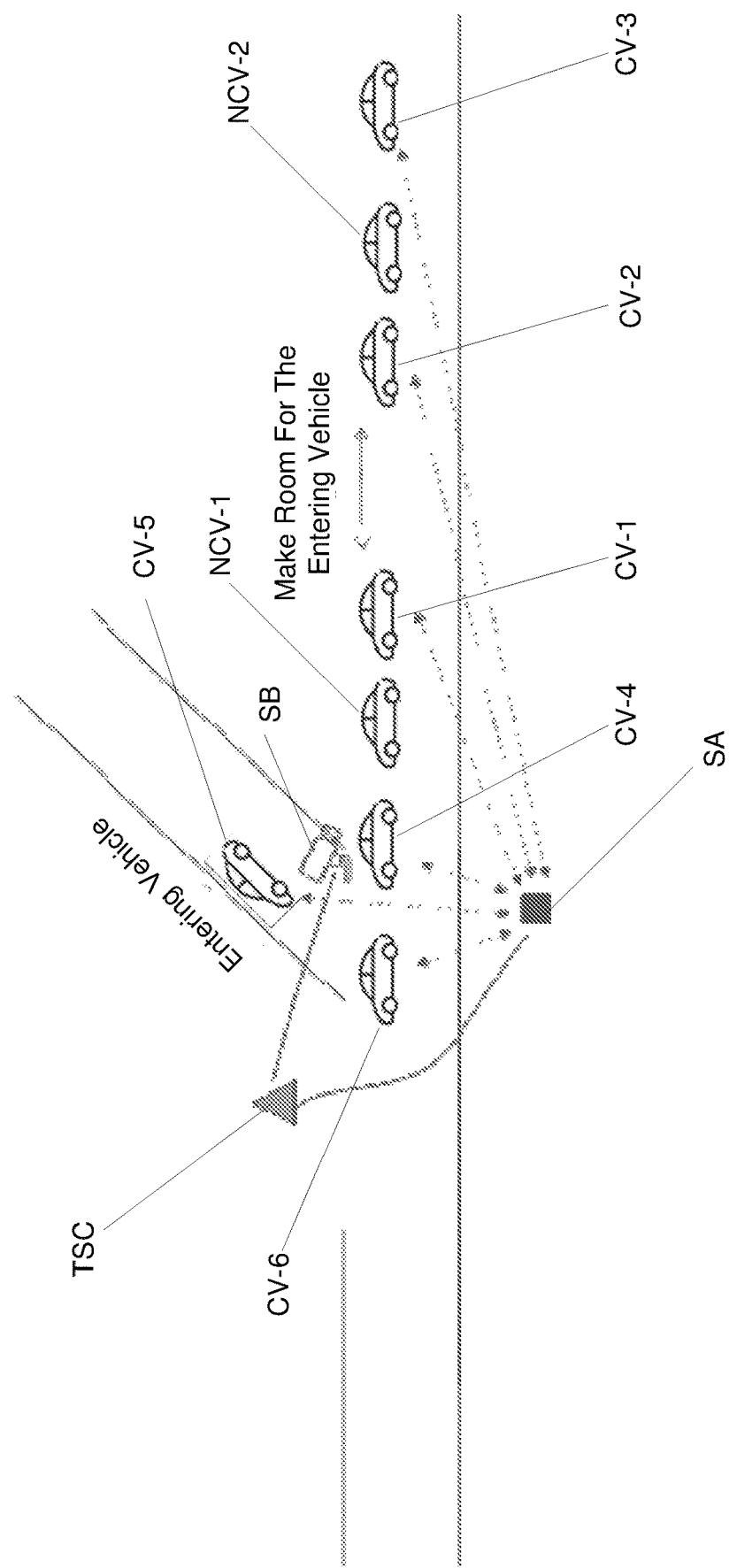
FIG. 4 is a diagram illustrating lane merge coordination according to some embodiments of inventive concepts.

According to some embodiments illustrated in FIG. 4, an intelligent transportation system may include a transportation system controller TSC (also referred to as a transportation control apparatus) coupled with V2X communication sensor SA (also referred to as an active vehicle detection sensor, a roadway communication node) and a passive vehicle detection sensor (e.g., a video traffic camera) SB at a merging lane on a highway. In the example of FIG. 4, collaborative vehicles CV-1, CV-2, CV-3, CV-4, CV-5, and CV-6 may automatically transmit position information to communication sensor SA; and non-collaborative vehicles NCV-1 and NCV-2 may be legacy vehicles that do not support communications with communication sensors of the intelligent transportation system.

Controller TSC may receive information (including positional information) from collaborative vehicles CV-1, CV-2, CV-3, CV-4, CV-5, and CV-6 via communication sensor SA allowing controller TSC to determine positions of collaborative vehicles CV-1, CV-2, CV-3, CV-4, CV-5, and CV-6. Controller TSC may also receive information from passive sensor SB allowing controller TSC to separately determine positions of collaborative vehicles CV-1, CV-2, CV-3, and CV-4 and non-collaborative vehicles NCV-1 and NCV-2. Controller TSC may then compare positions determined using information from communication sensor SA and positions determined using information from passive sensor SB to determine that vehicles NCV-1 and NCV-2 are non-collaborative with respect to the intelligent transportation system. Stated in other words, the discrepancy between vehicles/positions identified/determined using the two different sources may be used to identify non-collaborative vehicles.

Controller TSC may thus determine that no gap exists between vehicles CV-4 and CV-1 and that no gap exists between vehicles CV-2 and CV-3. Moreover, controller TSC can transmit instructions (e.g., through communication sensor/node SA) to collaborative vehicles CV-1 and CV-2 to create/maintain/increase a gap therebetween for merging vehicle CV-5. In addition or in an alternative, controller TSC can transmit instructions (e.g., through communication sensor/node SA) to collaborative vehicle CV-5 to merge into the gap between collaborative vehicles CV-1 and CV-2.

When comparing information received via different sources (e.g., from communication sensor SA-1 and from passive sensor SB-1 in FIG. 3, or from communication sensor SA and from passive sensor SB in FIG. 4), controller TSC may apply an offset relative to information from one or both sources to correlate differences in vehicle positions derived from the two sources. Such an offset may be used, for example, to account for differences in timing of information received from the different sources.

Figure 5:
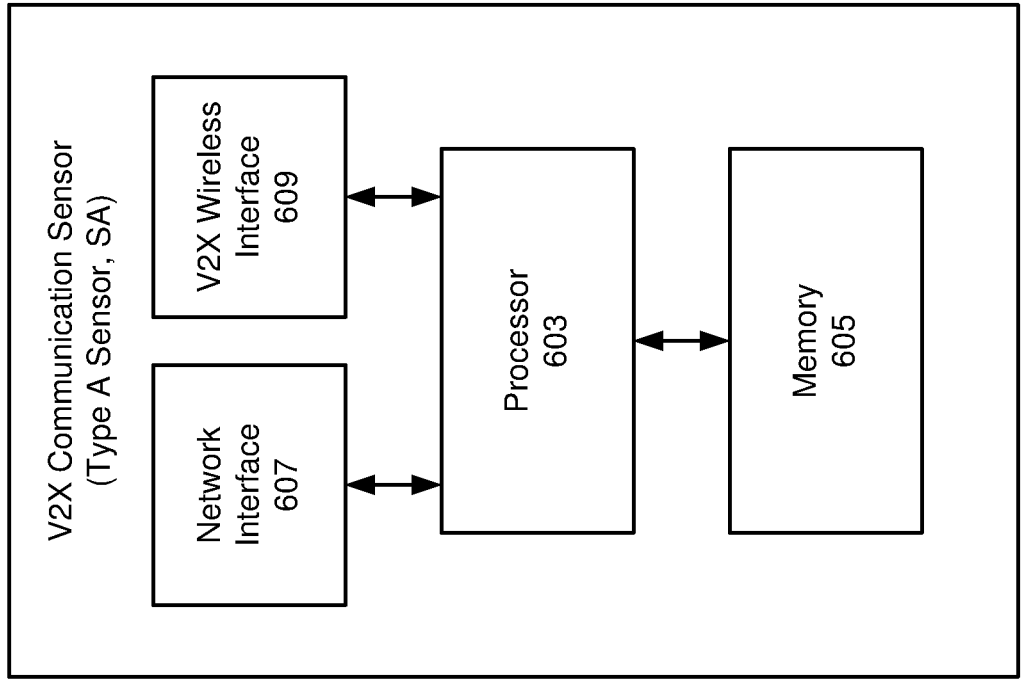
FIG. 5 is a block diagram illustrating elements of a transportation system controller (TSC) of FIG. 3 and/or FIG. 4.

FIG. 5 is a block diagram illustrating Transportation System Controller TSC according to some embodiments of inventive concepts. As shown, TSC may include processor 503 coupled between memory 505 and network interface 507. In addition to network interface 507 or as an alternative to network interface 507, TSC may also include V2X Wireless Interface 509 coupled with processor 503. Network interface 507 may be configured to provide network communications with one or more V2X Communication Sensors SA. V2X Wireless Interface 509 may be configured to provide direct communications with one or more V2X collaborative vehicles CV. Processor 503 (also referred to as a processor circuit or processing circuitry) may include one or more data processing circuits, such as a general purpose and/or special purpose processor (e.g., microprocessor and/or digital signal processor). Processor 503 may be configured to execute computer program instructions from functional modules in memory 505 (also referred to as a memory circuit or memory circuitry), described below as a computer readable medium, to perform some or all of the operations and methods that are described herein for one or more of the embodiments.

Figure 6:
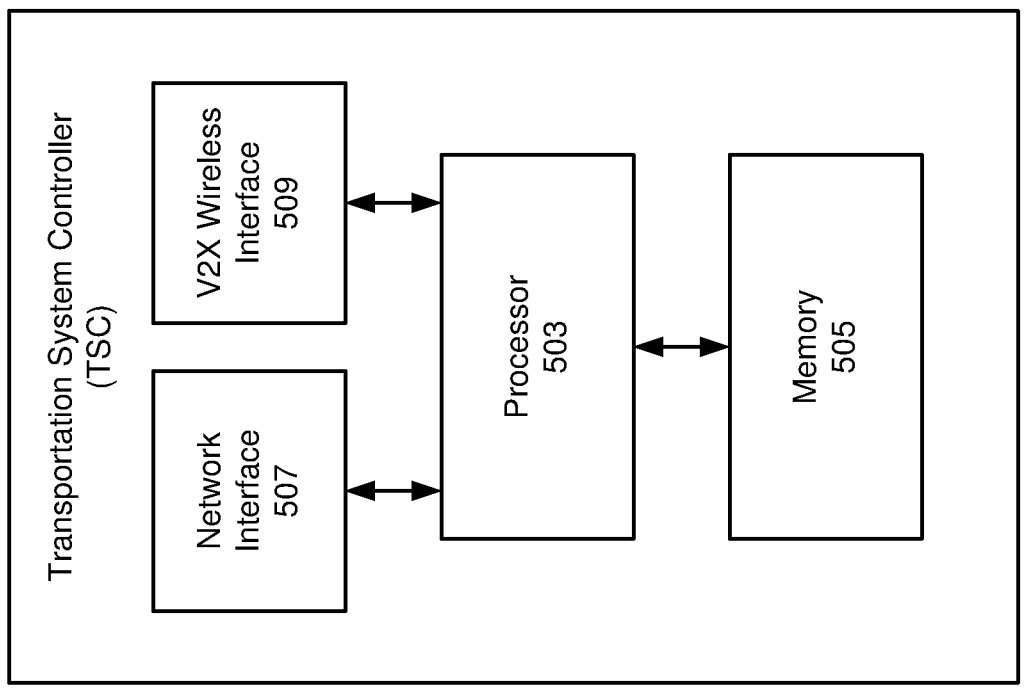
FIG. 6 is a block diagram illustrating elements of a V2X communication sensor (also referred to as a roadway communication node of the intelligent transportation system) of FIG. 3 and/or FIG. 4.

FIG. 6 is a block diagram illustrating a V2X Communication Sensor SA according to some embodiments of inventive concepts. As shown, V2X Communication Sensor SA may include processor 603 coupled between memory 605 and network interface 607. In addition, V2X Communication Sensor SA may also include V2X Wireless Interface 609 coupled with processor 603. Network interface 607 may be configured to provide network communications with TSC. V2X Wireless Interface 609 may be configured to provide direct communications with one or more V2X collaborative vehicles CV. Processor 603 (also referred to as a processor circuit or processing circuitry) may include one or more data processing circuits, such as a general purpose and/or special purpose processor (e.g., microprocessor and/or digital signal processor). Processor 603 may be configured to execute computer program instructions from functional modules in memory 605 (also referred to as a memory circuit or memory circuitry), described below as a computer readable medium, to perform some or all of the operations and methods that are described herein for one or more of the embodiments.

Figure 7:
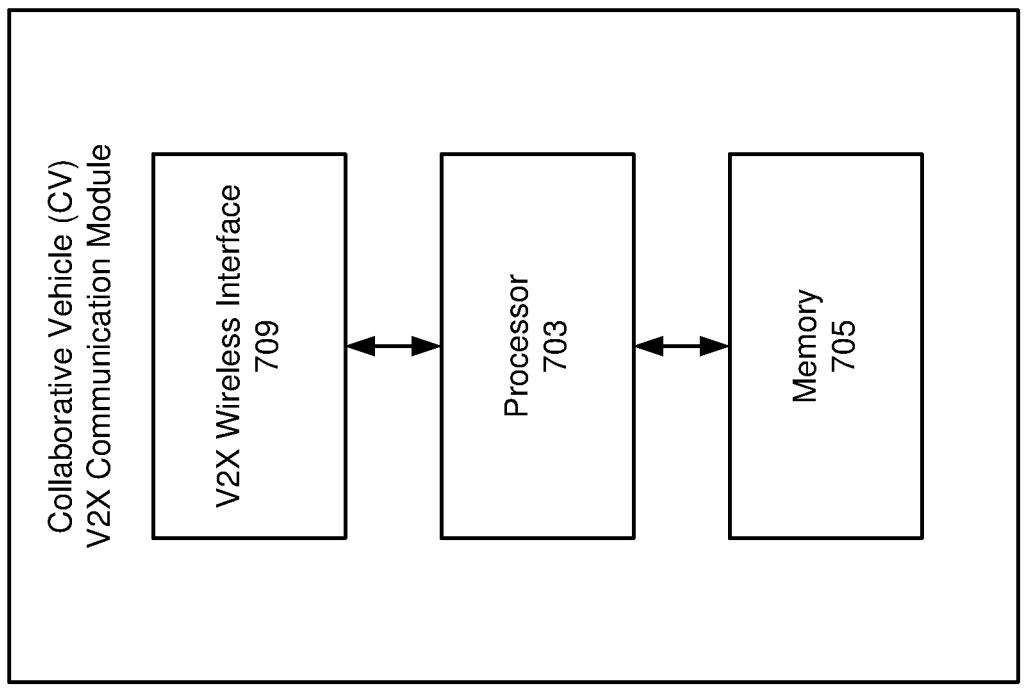
FIG. 7 is a block diagram illustrating elements of a collaborative vehicle V2X communication module of FIG. 3 and/or FIG. 4.

FIG. 7 is a block diagram illustrating a Collaborative Vehicle (CV) V2X Communication Module according to some embodiments of inventive concepts. As shown, the module of FIG. 7 may include processor 703 coupled between memory 705 and V2X wireless interface 709. V2X Wireless Interface 709 may be configured to provide direct communications with one or more V2X Communication Sensors. Processor 703 (also referred to as a processor circuit or processing circuitry) may include one or more data processing circuits, such as a general purpose and/or special purpose processor (e.g., microprocessor and/or digital signal processor). Processor 703 may be configured to execute computer program instructions from functional modules in memory 705 (also referred to as a memory circuit or memory circuitry), described below as a computer readable medium, to perform some or all of the operations and methods that are described herein for one or more of the embodiments.

Figure 8:
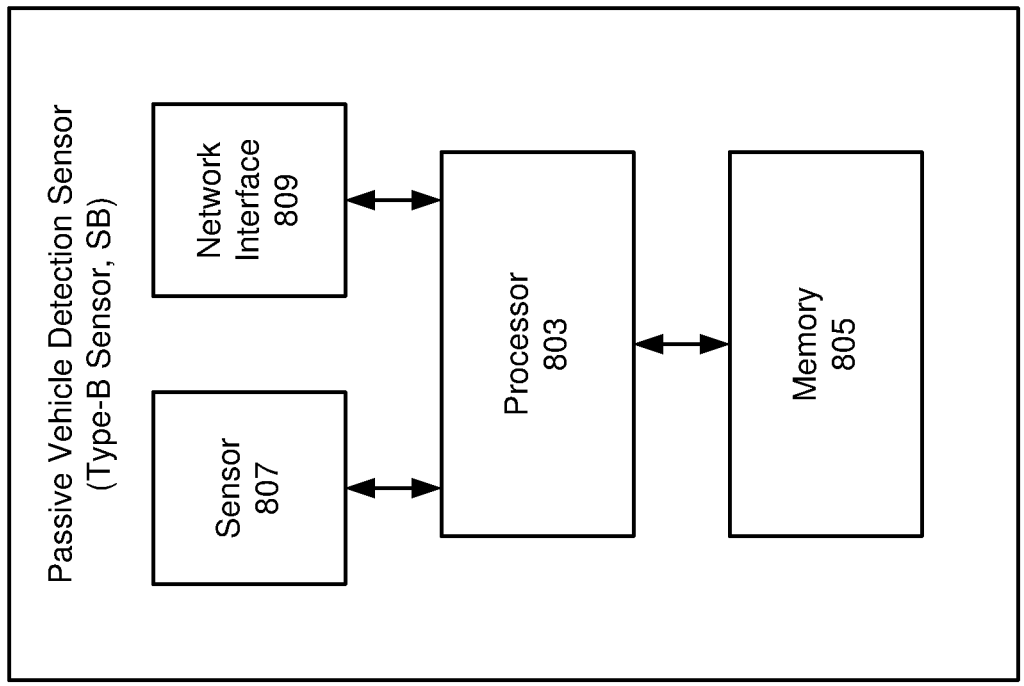
FIG. 8 is a block diagram illustrating elements of a passive vehicle detection sensor of FIG. 3 and/or FIG. 4.

FIG. 8 is a block diagram illustrating a Passive Vehicle Detection Sensor SB according to some embodiments of inventive concepts. As shown, the passive sensor of FIG. 8 may include processor 803 coupled between memory 805 and network interface 809. In addition, sensor 807 may be coupled with processor 803. Sensor 807, for example, may include a video camera, a radar sensor, a lidar sensor, a pressure sensor in/on the road, an inductive sensor in/on the road, a magnetic sensor in/on the road, etc. Network Interface 809 may be configured to provide communications with transportation system controller TSC. Processor 803 (also referred to as a processor circuit or processing circuitry) may include one or more data processing circuits, such as a general purpose and/or special purpose processor (e.g., microprocessor and/or digital signal processor). Processor 803 may be configured to execute computer program instructions from functional modules in memory 805 (also referred to as a memory circuit or memory circuitry), described below as a computer readable medium, to perform some or all of the operations and methods that are described herein for one or more of the embodiments.

Figure 9A:
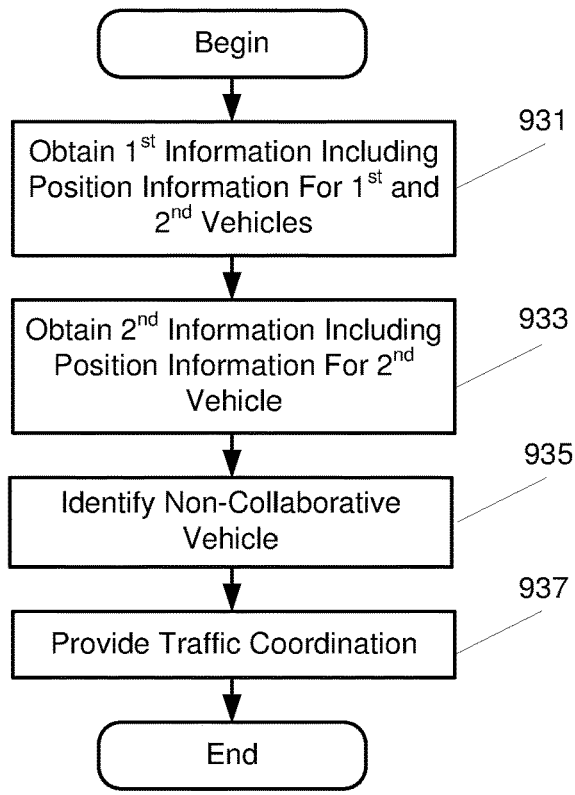
FIG. 9A is a flow chart illustrating operations of the transportation system controller of FIG. 5.
Figure 9B:
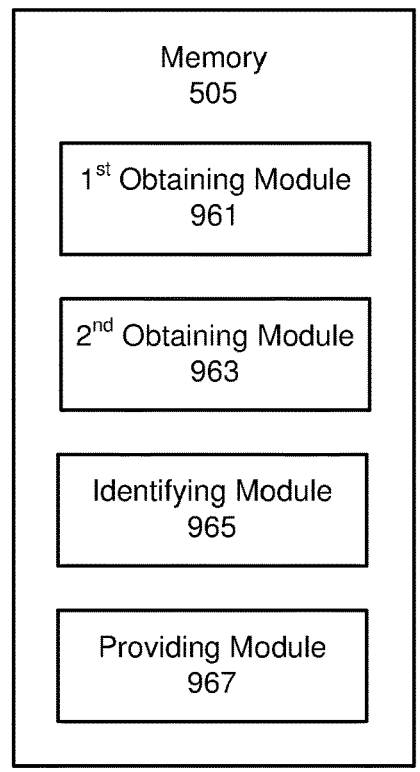
FIG. 9B is a module diagram illustrating related memory modules.

Operations of the transportation system controller TSC of FIG. 5 (also referred to as a transportation control apparatus) will now be discussed with reference to the flow chart of FIG. 9A and the modules of FIG. 9B, with the TSC being connected to at least one communication sensor/node SA and at least one passive sensor as discussed above, for example, with respect to FIGS. 3 and 4. For example, modules of FIG. 9B may be stored in TSC memory 505 of FIG. 5, and these modules may provide instructions so that when the instructions of a module are executed by TSC processor 503, processor 503 performs respective operations of the flow chart of FIG. 9A.

At block 931, processor 503 may obtain first traffic information from a first source (e.g., from a passive vehicle detection sensor SB, such as, a video camera, a magnetic sensor, an inductive sensor, a pressure sensor, a radar sensor, a lidar sensor, etc.), for example, using instructions from first obtaining module 961. The first traffic information may include position information for at least one non-collaborative vehicle NCV-1 and position information for at least one collaborative vehicle CV-2. Moreover, the first traffic information may be generated independently of the non-collaborative vehicle NCV-1.

The first traffic information, for example, may be generated independently of the non-collaborative vehicle NCV-1 based on video information using a video camera or cameras. Obtaining the first traffic information may thus include receiving the video information at processor 503 through a network interface 507 that is coupled with a video camera that is remote from processor 503.

The first traffic information may be generated independently of the non-collaborative vehicle NCV-1, and/or based on a sensor on and/or embedded in a roadway. The sensor embedded in the roadway may include at least one of a pressure sensor, an inductive sensor, and/or a magnetic sensor.

The first traffic information generated independently of the non-collaborative vehicle NCV-1 may include information generated by a radar sensor and/or a lidar sensor.

The first traffic information generated independently of the non-collaborative vehicle NCV-1 may include information generated at the collaborative vehicle CV-2 and/or information generated at another collaborative vehicle CV-3. A collaborative vehicle CV-2 or CV-3 may include a sensor such as a video camera, a radar sensor, a lidar sensor, etc., and information from such a camera/sensor may be provided using a V2X communication transmitted over a wireless interface through communication sensor/node SA and network interface 507 to processor 503.

At block 933, processor 503 may obtain second traffic information from a second source (e.g., through a communication sensor/node SA), for example, using instructions from second obtaining module 963. The second traffic information may include position information for the collaborative vehicle CV-2, but the second traffic information may omit position information for the non-collaborative vehicle NCV-1 because the non-collaborative vehicle NCV-1 does not provide such information. More particularly, the second source may include the collaborative vehicle CV-2 so that the position information for the collaborative vehicle is based a communication transmitted from the collaborative vehicle CV-2. Moreover, the second traffic information may include position information for a plurality of collaborative vehicles (e.g., collaborative vehicles CV-1, CV-2, CV-3, CV-4, and/or CV-5 of FIG. 4) based on respective communications transmitted from the plurality of collaborative vehicles without including position information for non-collaborative vehicles.

The communication transmitted from the collaborative vehicle CV-2 may be V2X communication transmitted from the collaborative vehicle CV-2 over a wireless interface. For example, obtaining the second traffic information may include receive the communication from the collaborative vehicle CV-2 at processor 503 through a network interface 507 and a V2X communication sensor SA, and the network interface 507 may be coupled with V2X Communication Sensor SA which is remote from processor 503. In an alternative, obtaining the second traffic information may include receiving the communication transmitted from the collaborative vehicle CV-2 at a processor 503 through V2X wireless interface 509 coupled with processor 503.

At block 935, processor 503 may identify the non-collaborative vehicle NCV-1 as being non-collaborative with respect to the intelligent transportation system responsive to comparing the first traffic information and the second traffic information, for example, using instructions from identifying module 965. Identifying the non-collaborative vehicle NCV-1 as being non-collaborative with respect to the intelligent transportation system may include identifying the non-collaborative vehicle NCV-1 as being non-collaborative based on inclusion of the position information for the non-collaborative vehicle NCV-1 in the first traffic information and omission of position information for the non-collaborative vehicle NCV-1 from the second traffic information.

At block 937, processor 503 may provide traffic coordination based on a position of the non-collaborative vehicle NCV-1, based on a position of the collaborative vehicle CV-1, and based on identifying the non-collaborative vehicle NCV-1 as being non-collaborative with respect to the intelligent transportation system. Processor 503, for example, may provide traffic coordination using instructions from providing module 967.

Processor 503, for example, may provide traffic coordination by transmitting a traffic coordination communication through network interface 507 and a communication sensor/node to the collaborative vehicle CV-2 and/or to another collaborative vehicle CV-5. Such traffic coordination communication may include a warning message, a driver assistance instruction, intended trajectory information (e.g., for one or more of collaborative vehicles CV-1, CV-2, CV-3, CV-4, etc.), and/or a self-driving vehicle instruction.

Processor 503 may provide traffic coordination by generating a dynamic map including information identifying positions, speeds, and/or directions of travel of the non-collaborative vehicle NCV-1 and the collaborative vehicle CV-2.

Processor 503 may provide traffic coordination by determining a number and/or percentage of vehicles that are non-collaborative with respect to the intelligent transportation system. Processor 503, for example, may generate a warning responsive to the number and/or percentage exceeding a threshold, and processor 503 may transmit the warning as a warning communication through network interface 507 and a communication sensor/node SA to the collaborative vehicle CV-2 and/or to another collaborative vehicle CV-3. In addition or in an alternative, processor 503 may control a display/signal (e.g., a roadside sign, a traffic light, etc.) to provide the warning as a visual warning.

Figure 10A:
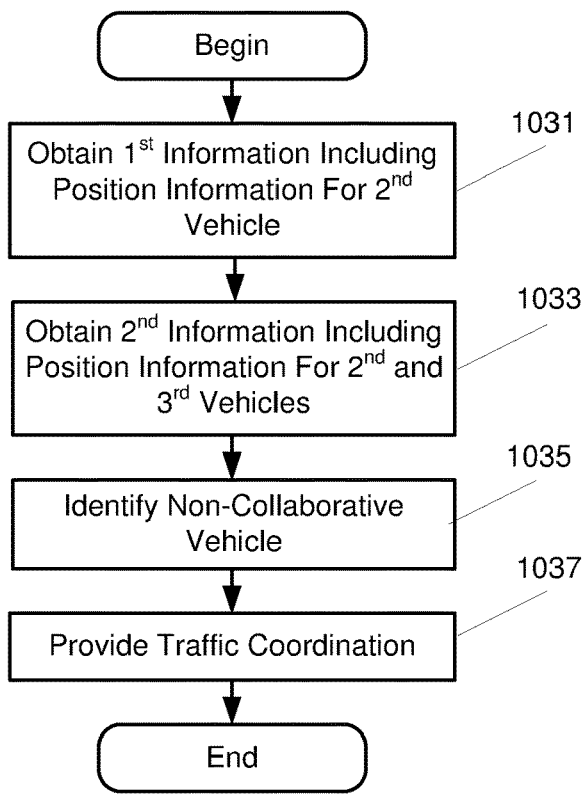
FIG. 10A is a flow chart illustrating operations of the collaborative vehicle V2X communication module of FIG. 7.
Figure 10B:
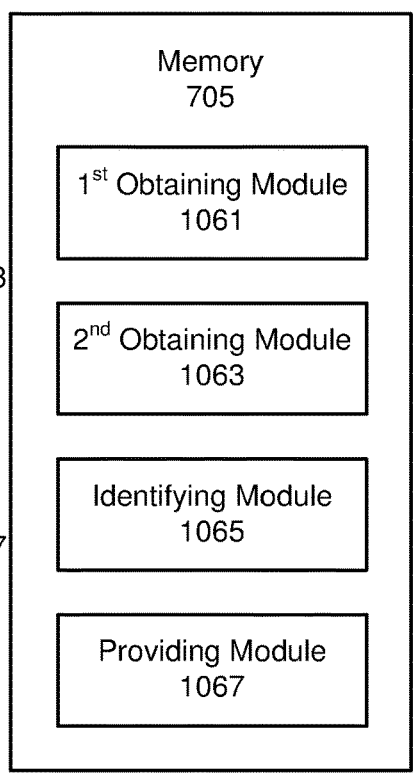
FIG. 10B is a module diagram illustrating related memory modules.

Operations of the Collaborative Vehicle V2X (CV) Communication Module of FIG. 7 (also referred to as a terminal device) will now be discussed with reference to the flow chart of FIG. 10A and the modules of FIG. 10B, with the CV Communication Module providing communication with a Transportation System Controller via a V2X Communication Sensor (also referred to as a roadway communication node SA, or a communication sensor/node SA) as discussed above, e.g., with respect to FIGS. 3 and 4. For example, modules of FIG. 10B may be stored in memory 705 of FIG. 7, and these modules may provide instructions so that when the instructions of a module are executed by processor 703, processor 703 performs respective operations of the flow chart of FIG. 10A.

At block 1031, processor 703 of collaborative vehicle CV-1 may obtain first traffic information that includes position information for collaborative vehicle CV-2 based on a communication transmitted from the collaborative vehicle CV-2. Processor 703 may obtain the first traffic information, for example, using instructions of first obtaining module 1061.

Processor 703, for example, may obtain the first traffic information by receiving the first traffic information through V2X wireless interface 709 via a roadway communication node SA separate from the collaborative vehicle CV-2. In an alternative, processor 703 may obtain the first traffic information by receiving the communication transmitted from the collaborative vehicle CV-2 directly from the collaborative vehicle CV-2.

At block 1033, processor 703 may obtain second traffic information that includes position information for collaborative vehicle CV-2 and for non-collaborative vehicle NCV-1, with the second traffic information being generated independently of non-collaborative vehicle NCV-1. Processor 703 may obtain the second traffic information, for example, using instructions of second obtaining module 1063.

Processor 703 may obtain the second traffic information by receiving the second traffic information through V2X wireless interface 703 via a roadway communication node SA separate from collaborative vehicle CV-2, and the second traffic information may be based on a sensor separate from collaborative vehicle CV-2. The sensor may include at least one of a pressure sensor, an inductive sensor, a magnetic sensor, a radar sensor, a lidar sensor, and/or a video camera.

Processor 703 may obtain the second traffic information by generating the second traffic information based on a sensor on the vehicle CV-1. Such a sensor on the vehicle CV-1 may include at least one of a video camera, a radar sensor, and/or a lidar sensor.

At block 1035, processor 703 may identify non-collaborative vehicle NCV-1 as being non-collaborative with respect to the intelligent transportation system responsive to comparing the first traffic information and the second traffic information. Processor 703 may identify non-collaborative vehicle NCV-1 as being non-collaborative, for example, using instructions of identifying module 1065.

At block 1037, processor 703 may provide traffic coordination based on positions of the collaborative vehicle CV-1, the collaborative vehicle CV-2, and non-collaborative vehicle NCV-1, and based on identifying non-collaborative vehicle NCV-1 as being non-collaborative with respect to the intelligent transportation system. Processor 703 may provide traffic coordination, for example, using instructions of providing module 1067.

Processor 703 may provide traffic coordination by transmitting information through V2X wireless interface 709 to at least one of collaborative vehicle CV-2 and/or another collaborative vehicle, with the information including at least one of position information for the vehicle CV-1, position information for the collaborative vehicle CV-2, and/or position information for the non-collaborative vehicle NCV-1.

Processor 703 may provide traffic coordination by transmitting information through V2X wireless interface 709 to a communication sensor/node SA of the intelligent transportation system, with the information including at least one of position information for the first vehicle, position information for the second vehicle, and/or position information for the third vehicle.

Processor 703 may provide traffic coordination by generating a warning message and/or an automated driving instruction to operate the collaborative vehicle CV-1.

Processor 703 may provide traffic coordination by transmitting at least one of a warning message, an automated driving instruction, and/or intended trajectory information (e.g., for collaborative vehicle CV-1) through V2X wireless interface 709 to at least one of collaborative vehicle CV-2 and/or another collaborative vehicle. Processor 703 may transmit at least one of the warning message, the automated driving instruction, and/or the intended trajectory information through V2X wireless interface 709 directly to at least one of the second vehicle and/or a fourth vehicle. Processor may transmit at least one of the warning message, the automated driving instruction, and/or the intended trajectory information through V2X wireless interface 709 to at least one of collaborative vehicle CV-2 and/or another collaborative vehicle via a communication sensor/node SA of the intelligent transportation system.

EXAMPLE EMBODIMENTS

Embodiment 1

A method of operating an intelligent transportation system, the method comprising: obtaining (931) first traffic information from a first source, wherein the first traffic information includes position information for a first vehicle (NCV-1), and wherein the first traffic information is generated independently of the first vehicle (NCV-1); obtaining (933) second traffic information from a second source, wherein the second traffic information omits position information for the first vehicle (NCV-1); responsive to comparing the first traffic information and the second traffic information, identifying (935) the first vehicle (NCV-1) as being non-collaborative with respect to the intelligent transportation system; and providing (937) traffic coordination based on a position of the first vehicle (NCV-1) and based on identifying the first vehicle (NCV-1) as being non-collaborative with respect to the intelligent transportation system.

Embodiment 2

The method of Embodiment 1, wherein the first traffic information includes first position information for a second vehicle (CV-2), wherein the second traffic information includes second position information for the second vehicle, wherein the second source includes the second vehicle (CV-2) so that the second position information for the second vehicle is based a communication transmitted from the second vehicle, and wherein providing traffic coordination is based on positions of the first and second vehicles (NCV-1 and CV-2).

Embodiment 3

The method of any of Embodiments 1-2, wherein identifying the first vehicle (NCV-1) as being non-collaborative with respect to the intelligent transportation system comprises identifying the first vehicle (NCV-1) as being non-collaborative based on inclusion of the position information for the first vehicle (NCV-1) in the first traffic information and omission of position information for the first vehicle (NCV-1) from the second traffic information.

Embodiment 4

The method of any of Embodiments 1-3, wherein the second traffic information includes position information for a plurality of vehicles based on respective communications transmitted from the plurality of vehicles without including position information for the first vehicle.

Embodiment 5

The method of any of Embodiments 2-4, wherein the communication transmitted from the second vehicle is a V2X communication transmitted from the second vehicle over a wireless interface.

Embodiment 6

The method of Embodiment 5, wherein obtaining the second traffic information comprises receiving the communication from the second vehicle (CV-2) at a processor (503) of the intelligent transportation system through a network interface (507) and a V2X communication sensor (SA), wherein the network interface is coupled with the V2X Communication Sensor which is remote from the processor (503).

Embodiment 7

The method of Embodiment 5, wherein obtaining the second traffic information comprises receiving the communication transmitted from the second vehicle (CV-2) at a processor (503) of the intelligent transportation system through a V2X wireless interface (509) coupled with the processor (503).

Embodiment 8

The method of any of Embodiments 1-7, wherein the first traffic information generated independently of the first vehicle (NCV-1) is based on video information.

Embodiment 9

The method of Embodiment 8, wherein obtaining the first traffic information comprises receiving the video information at a processor (503) of the intelligent transportation system through a network interface (507) that is coupled with a video camera that is remote from the processor (503).

Embodiment 10

The method of any of Embodiments 1-9, wherein the first traffic information generated independently of the first vehicle (NCV-1) comprises information generated based on a sensor on and/or embedded in a roadway.

Embodiment 11

The method of Embodiment 10, wherein the sensor on and/or embedded in the roadway comprises at least one of a pressure sensor, an inductive sensor, and/or a magnetic sensor.

Embodiment 12

The method of any of Embodiments 1-11 wherein the first traffic information generated independently of the first vehicle (NCV-1) comprises information generated by a radar sensor and/or a lidar sensor.

Embodiment 13

The method of any of Embodiments 2-4 and 6-12 wherein the first traffic information generated independently of the first vehicle (NCV-1) comprises information generated at the second vehicle (CV-2) and/or information generated at a third vehicle (CV-3).

Embodiment 14

The method of Embodiment 13 wherein the information generated at the second vehicle (CV-2) and/or the third vehicle (CV-3) is provided using a V2X communication transmitted from the second vehicle (CV-2) and/or the third vehicle (CV-3) over a wireless interface.

Embodiment 15

The method of any of Embodiments 13-14 wherein the information generated independently of the first vehicle (NCV-1) is based on at least one of video, lidar, and/or radar information generated at the second vehicle (CV-2) and/or the third vehicle (CV-3).

Embodiment 16

The method of any of Embodiments 1-15, wherein providing traffic coordination comprises transmitting a traffic coordination communication to the second vehicle (CV-2) and/or to another vehicle (CV-5).

Embodiment 17

The method of Embodiment 16, wherein the traffic coordination communication comprises at least one of a warning message and/or intended trajectory information.

Embodiment 18

The method of any of Embodiments 16-17, wherein the traffic coordination communication comprises a driver assistance instruction.

Embodiment 19

The method of any of Embodiments 16-18, wherein the traffic coordination communication comprises a self-driving vehicle instruction.

Embodiment 20

The method of any of Embodiments 2-19, wherein providing traffic coordination comprises generating a dynamic map including information identifying positions, speeds, and/or directions of travel of the first vehicle (NCV-1) and the second vehicle (CV-2).

Embodiment 21

The method of any of Embodiments 2-20, wherein providing traffic coordination comprises determining a number and/or percentage of vehicles that are non-collaborative with respect to the intelligent transportation system.

Embodiment 22

The method of Embodiment 21 wherein providing traffic coordination comprises generating a warning responsive to the number and/or percentage exceeding a threshold.

Embodiment 23

The method of Embodiment 22 wherein providing traffic coordination comprises transmitting the warning as a warning communication to the second vehicle (CV-2) and/or to a third vehicle (CV-3).

Embodiment 24

The method of any of Embodiments 22-23 wherein providing traffic coordination comprises controlling a display/signal to provide the warning as a visual warning.

Embodiment 25

A transportation system controller (TSC) of an intelligent transportation system, the transportation system controller (TSC) comprising: a network interface (507) configured to communicate with a roadway communication node (SA) and a vehicle detection sensor (SB); and a processor (503) coupled to the network interface (507), wherein the processor (503) is configured to perform operations according to any of Embodiments 1-24.

Embodiment 26

A transportation system controller (TSC) of an intelligent transportation system, wherein the transportation system controller (TSC) is adapted to perform according to any of Embodiments 1-24.

Embodiment 27

A transportation system controller (TSC) of an intelligent transportation system, the transportation system controller (TSC) comprising: a first obtaining module (961) configured to obtain first traffic information from a first source, wherein the first traffic information includes position information for a first vehicle (NCV-1), and wherein the first traffic information is generated independently of the first vehicle (NCV-1); a second obtaining module (963) configured to obtain second traffic information from a second source, wherein the second traffic information omits position information for the first vehicle (NCV-1); an identifying module (965) configured to identify the first vehicle (NCV-1) as being non-collaborative with respect to the intelligent transportation system responsive to comparing the first traffic information and the second traffic information; and a providing module (967) configured to provide traffic coordination based on a position of the first vehicle (NCV-1) and based on identifying the first vehicle (NCV-1) as being non-collaborative with respect to the intelligent transportation system.

Embodiment 28

The transportation system controller of Embodiment 27 wherein the first obtaining module, the second obtaining module, the identifying module, and/or the providing module is/are further configured to according to any of Embodiments 2-24.

Embodiment 29

A computer program product comprising a non-transitory computer readable storage medium (505) storing instructions which when run on a processor (503) causes a transportation system controller (TSC) including the processor (503) to perform the steps of any of Embodiments 1-24.

Embodiment 30

A method of operating a first vehicle (CV-1) in an intelligent transportation system, the method comprising: obtaining (1031) first traffic information that includes position information for a second vehicle (CV-2) based on a communication transmitted from the second vehicle (CV-2); obtaining (1033) second traffic information that includes position information for the second vehicle (CV-2) and for a third vehicle (NCV-1) wherein the second traffic information is generated independently of the third vehicle (NCV-1); responsive to comparing the first traffic information and the second traffic information, identifying (1035) the third vehicle (NCV-1) as being non-collaborative with respect to the intelligent transportation system; and providing (1037) traffic coordination based on positions of the first vehicle (CV-1), the second vehicle (CV-2), and the third vehicle (NCV-1), and based on identifying the third vehicle as being non-collaborative with respect to the intelligent transportation system.

Embodiment 31

The method of Embodiment 30, wherein obtaining the first traffic information comprises receiving the first traffic information via a roadway communication node separate from the second vehicle (CV-2).

Embodiment 32

The method of Embodiment 30, wherein obtaining the first traffic information comprises receiving the communication transmitted from the second vehicle (CV-2) directly from the second vehicle.

Embodiment 33

The method of any of Embodiments 30-32, wherein obtaining the second traffic information comprises receiving the second traffic information via a roadway communication node separate from the second vehicle (CV-2), and wherein the second traffic information is based on a sensor separate from the second vehicle.

Embodiment 34

The method of Embodiment 33, wherein the sensor comprises at least one of a pressure sensor, an inductive sensor, a magnetic sensor, a radar sensor, a lidar sensor, and/or a video camera.

Embodiment 35

The method of any of Embodiments 30-32, wherein obtaining the second traffic information comprises generating the second traffic information based on a sensor on the vehicle.

Embodiment 36

The method of Embodiment 35, wherein the sensor comprises at least one of a video camera, a radar sensor, and/or a lidar sensor.

Embodiment 37

The method of any of Embodiments 30-36, wherein providing traffic coordination comprises transmitting information including at least one of position information for the first vehicle, position information for the second vehicle, and/or position information for the third vehicle to at least one of the second vehicle and/or a fourth vehicle.

Embodiment 38

The method of any of Embodiments 30-37, wherein providing traffic coordination comprises transmitting information including at least one of position information for the first vehicle, position information for the second vehicle, and/or position information for the third vehicle to a communication node of the intelligent transportation system.

Embodiment 39

The method of any of Embodiments 30-38, wherein providing traffic coordination comprises generating a warning message and/or an automated driving instruction to operate the first vehicle.

Embodiment 40

The method of any of Embodiments 30-39, wherein providing traffic coordination comprises transmitting at least one of a warning message, an automated driving instruction, and/or intended trajectory information to at least one of the second vehicle and/or a fourth vehicle.

Embodiment 41

The method of Embodiment 40 wherein transmitting comprises transmitting at least one of the warning message, the automated driving instruction, and/or the intended trajectory information directly to at least one of the second vehicle and/or a fourth vehicle.

Embodiment 42

The method of Embodiment 40 wherein transmitting comprises transmitting at least one of the warning message, the automated driving instruction, and/or the intended trajectory information to at least one of the second vehicle and/or a fourth vehicle via a communication node of the intelligent transportation system.

Embodiment 43

A terminal device of a collaborative vehicle configured to operate in an intelligent transportation system, the terminal device comprising: a wireless interface (709) configured to communicate with a roadway communication node (SA); and a processor (703) coupled to the wireless interface (709), wherein the processor (703) is configured to perform operations according to any of Embodiments 30-42.

Embodiment 44

A terminal device of a collaborative vehicle configured to operate in an intelligent transportation system, wherein the terminal device is adapted to perform according to any of Embodiments 30-42.

Embodiment 45

A terminal device of a collaborative vehicle configured to operate in an intelligent transportation system, the terminal device comprising: a first obtaining module (1061) configured to obtain first traffic information that includes position information for a second vehicle (CV-2) based on a communication transmitted from the second vehicle (CV-2); a second obtaining module (1063) configured to obtain second traffic information that includes position information for the second vehicle (CV-2) and for a third vehicle (NCV-1) wherein the second traffic information is generated independently of the third vehicle (NCV-1); an identifying module (1065) configured to identify the third vehicle (NCV-1) as being non-collaborative with respect to the intelligent transportation system responsive to comparing the first traffic information and the second traffic information; and a providing module (1067) configured to provide traffic coordination based on positions of the first vehicle (CV-1), the second vehicle (CV-2), and the third vehicle (NCV-1), and based on identifying the third vehicle as being non-collaborative with respect to the intelligent transportation system.

Embodiment 46

The terminal device of Embodiment 45 wherein the first obtaining module, the second obtaining module, the identifying module, and/or the providing module is/are further configured to perform according to any of Embodiments 31-42.

Embodiment 47

A computer program product comprising a non-transitory computer readable storage medium (705) storing instructions which when run on a processor (703) causes a terminal device of a collaborative vehicle including the processor (503) to perform the steps of any of Embodiments 30-42.

Abbreviations

| Abbreviation | Explanation |
| --- | --- |
| CV | Collaborative Vehicle |
| NCV | Non-Collaborative Vehicle |
| ITS | Intelligent Transport System |
| TSC | Transportation System Controller |
| VRU | Vulnerable Road User |
| V2X | Vehicle to "anything" communication |
| V2P | Vehicle to Pedestrian |
| V2V | Vehicle to vehicle |
| V2I | Vehicle to infrastructure |

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating an intelligent transportation system, the method comprising:
   obtaining first traffic information from a first source, wherein the first traffic information includes position information for a first vehicle and first position information for a second vehicle, wherein the first traffic information is generated independently of the first vehicle;
   obtaining second traffic information from a second source, wherein the second traffic information includes second position information for the second vehicle, wherein the second traffic information omits position information for the first vehicle, wherein the second vehicle is collaborative with respect to the intelligent transportation system such that the second vehicle supports communication with the transportation system controller, and wherein the second source includes the second vehicle so that the second position information for the second vehicle is based on a communication transmitted from the second vehicle;
   responsive to comparing the first traffic information and the second traffic information, identifying the first vehicle as being non-collaborative with respect to the intelligent transportation system such that the first vehicle does not support communication with the transportation system controller; and
   providing traffic coordination based on a position of the first vehicle, based on a position of the second vehicle, and based on identifying the first vehicle as being non-collaborative with respect to the intelligent transportation system, wherein providing traffic coordination comprises determining a number and/or percentage of vehicles that are non-collaborative with respect to the intelligent transportation system such that the vehicles that are non-collaborative with respect to the intelligent transportation system do not support communication with the transportation system controller, and generating a warning responsive to the number and/or percentage of vehicles that are non-collaborative with respect to the intelligent transportation system exceeding a threshold, wherein the warning includes the number and/or percentage of vehicles that are non-collaborative.

2. The method of claim 1, wherein providing traffic coordination comprises generating a dynamic map including information identifying positions, speeds, and/or directions of travel of the first vehicle and the second vehicle.

3. The method of claim 1, wherein providing traffic coordination comprises controlling a roadside sign and/or traffic light to provide the warning as a visual warning.

4. A transportation system controller of an intelligent transportation system, the transportation system controller comprising:
 a network interface configured to communicate with a roadway communication node and a vehicle detection sensor; and
 a processor coupled to the network interface, wherein the processor is configured to perform operations comprising:
  obtaining first traffic information from a first source, wherein the first traffic information includes position information for a first vehicle and first position information for a second vehicle, and wherein the first traffic information is generated independently of the first vehicle;
  obtaining second traffic information from a second source, wherein the second traffic information includes second position information for the second vehicle, wherein the second traffic information omits position information for the first vehicle, wherein the second vehicle is collaborative with respect to the intelligent transportation system such that the second vehicle supports communication with the transportation system controller, and wherein the second source includes the second vehicle so that the second position information for the second vehicle is based on a communication transmitted from the second vehicle;
  responsive to comparing the first traffic information and the second traffic information identifying the first vehicle as being non-collaborative with respect to the intelligent transportation system such that the first vehicle does not support communication with the transportation system controller; and
  providing traffic coordination based on a position of the first vehicle, based on a position of the second vehicle, and based on identifying the first vehicle as being non-collaborative with respect to the intelligent transportation system, wherein providing traffic coordination comprises determining a number and/or percentage of vehicles that are non-collaborative with respect to the intelligent transportation system such that the vehicles that are non-collaborative with respect to the intelligent transportation system do not support communication with the transportation system controller, and generating a warning responsive to the number and/or percentage of vehicles that are non-collaborative with respect to the intelligent transportation system exceeding a threshold, wherein the warning includes the number and/or percentage of vehicles that are non-collaborative.

5. The transportation system controller of claim 4, wherein identifying the first vehicle as being non-collaborative with respect to the intelligent transportation system comprises identifying the first vehicle as being non-collaborative based on inclusion of the position information for the first vehicle in the first traffic information and omission of position information for the first vehicle from the second traffic information.

6. The transportation system controller of claim 4, wherein the second traffic information includes position information for a plurality of vehicles based on respective communications transmitted from the plurality of vehicles without including position information for the first vehicle.

7. The transportation system controller of claim 4, wherein the communication transmitted from the second vehicle is a V2X communication transmitted from the second vehicle over a wireless interface.

8. The transportation system controller of claim 4, wherein the first traffic information generated independently of the first vehicle is based on video information.

9. The transportation system controller of claim 4, wherein the first traffic information generated independently of the first vehicle comprises information generated based on a sensor on and/or embedded in a roadway.

10. The transportation system controller of claim 4, wherein the first traffic information generated independently of the first vehicle comprises information generated at the second vehicle and/or information generated at a third vehicle.

11. The transportation system controller of claim 10 wherein the information generated at the second vehicle and/or the third vehicle is provided using a V2X communication transmitted from the second vehicle and/or the third vehicle over a wireless interface.

12. The transportation system controller of claim 4, wherein providing traffic coordination comprises transmitting a traffic coordination communication to the second vehicle and/or to another vehicle.

13. The transportation system controller of claim 4, wherein providing traffic coordination comprises controlling a roadside sign and/or traffic light to provide the warning as a visual warning.

14. The transportation system controller of claim 4, wherein providing traffic coordination comprises generating a dynamic map including information identifying positions, speeds, and/or directions of travel of the first vehicle and the second vehicle.

* * * * *